(12) United States Patent
Nakano

(10) Patent No.: US 11,533,432 B2
(45) Date of Patent: Dec. 20, 2022

(54) IMAGING DEVICE AND BLURRED-IMAGE CORRECTION METHOD

(71) Applicant: Ricoh Company, Ltd., Tokyo (JP)

(72) Inventor: Akira Nakano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 143 days.

(21) Appl. No.: 17/188,897

(22) Filed: Mar. 1, 2021

(65) Prior Publication Data

US 2021/0274097 A1 Sep. 2, 2021

(30) Foreign Application Priority Data

Mar. 2, 2020 (JP) .............................. JP2020-035249

(51) Int. Cl.
*H04N 5/232* (2006.01)

(52) U.S. Cl.
CPC ..... *H04N 5/23261* (2013.01); *H04N 5/23258* (2013.01); *H04N 5/23287* (2013.01)

(58) Field of Classification Search
CPC ........... H04N 5/23261; H04N 5/23258; H04N 5/23287; H04N 5/2253
See application file for complete search history.

(56) References Cited

U.S. PATENT DOCUMENTS

| 2009/0086040 | A1 | 4/2009 | Ohno |
| 2012/0200762 | A1 | 8/2012 | Nakano |
| 2012/0236164 | A1 | 9/2012 | Nakano |
| 2017/0019599 | A1 | 1/2017 | Muramatsu et al. |
| 2019/0191082 | A1 | 6/2019 | Uehara et al. |
| 2021/0337127 | A1 * | 10/2021 | Uesugi ................... G03B 17/02 |

FOREIGN PATENT DOCUMENTS

| JP | 2009-075532 | 4/2009 |
| JP | 2016-218256 | 12/2016 |

* cited by examiner

*Primary Examiner* — Twyler L Haskins
*Assistant Examiner* — Angel L Garces-Rivera
(74) *Attorney, Agent, or Firm* — Xsensus LLP

(57) ABSTRACT

An imaging device includes an imaging optical system through which object light flux passes, an image sensor to form the object light flux that has passed through the imaging optical system as an object image, a shake detector to detect shake, a blurred-image correction unit including at least one of the image sensor and an optical element that makes up at least a part of the imaging optical system, a drive circuit to drive the blurred-image correction unit in a direction different from an optical axis of the imaging optical system to move a position on the image sensor at which the object image is formed, to correct a blurred image, and a drive controller to control, based on a current position and a control objective position of the blurred-image correction unit, operation of the blurred-image correction unit by the drive circuit at a constant control cycle.

20 Claims, 13 Drawing Sheets

IMAGING DEVICE AND BLURRED-IMAGE CORRECTION METHOD

CROSS-REFERENCE TO RELATED APPLICATION

This patent application is based on and claims priority pursuant to 35 U.S.C. § 119(a) to Japanese Patent Application No. 2020-035249, filed on Mar. 2, 2020, in the Japan Patent Office, the entire disclosure of which is hereby incorporated by reference herein.

BACKGROUND

Technical Field

Embodiments of the present disclosure relate to an imaging device that has a blurred-image corrective mechanism and a method of controlling the blurred-image corrective mechanism.

Background Art

When an image is captured using an imaging device such as a digital camera and such an imaging device is held by hand, the captured image may be blurred in an unintentional manner due to camera shake. In view of such circumstances, shake reduction (SR) technologies for image capturing are known in the art that drive a part of an imaging device or an imaging optical system that serves as a blurred-image corrective mechanism in a direction perpendicular to the optical axis so as to cancel the shake. For cameras provided with a shake reduction mechanism, the normal state in which the camera is held by hand, the panning state in which the camera is widely panned, and the following state in which the camera follows an object at a constant velocity slower than the panning state are states in which the shake reduction (SR) is turned on, and technologies to determine to which one of the states the camera is to belong based on a shake detection signal and to change a method of controlling the shake reduction mechanism depending on each one of the states are known in the art.

SUMMARY

Embodiments of the present disclosure described herein provide an imaging device and a method of correcting a blurred image. The imaging device includes an imaging optical system through which object light flux passes, an image sensor to form the object light flux that has passed through the imaging optical system as an object image, a shake detector to detect shake, a blurred-image correction unit including at least one of the image sensor and an optical element that makes up at least a part of the imaging optical system, a drive circuit to drive the blurred-image correction unit in a direction different from an optical axis of the imaging optical system to move a position on the image sensor at which the object image is formed, to correct a blurred image, and a drive controller to control, based on a current position and a control objective position of the blurred-image correction unit, operation of the blurred-image correction unit by the drive circuit at a constant control cycle. The drive controller includes a low pass filter to which a shake detection signal output from the shake detector is input and a state determining unit configured to determine to which one of a plurality of states the imaging device belongs, and the plurality of states include a panning state, and the state determining unit is configured to determine that the imaging device belongs to the panning state when the shake detection signal is greater than a panning state threshold. The plurality of states include a following state, and the state determining unit is configured to determine that the imaging device belong to one of the plurality of states other than the panning state based on an output signal from the low pass filter when the state determining unit determines that the imaging device does not belong to the panning state, and the state determining unit is configured to determine that the imaging device belongs to the following state when the output signal from the low pass filter is continuously greater than a following state detection threshold that is smaller than the panning state threshold for a period of time longer than a following state detection time threshold that is determined based on the output signal from the low pass filter. The drive controller is configured to make the drive circuit compute an amount of movement of the blurred-image correction unit according to the state determined by the state determining unit, and the shake detection signal is sampled per the constant control cycle, and the drive controller is configured to compute the amount of movement of the blurred-image correction unit based on the shake detection signal from which the output signal of the low pass filter that is computed per the constant control cycle is subtracted.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
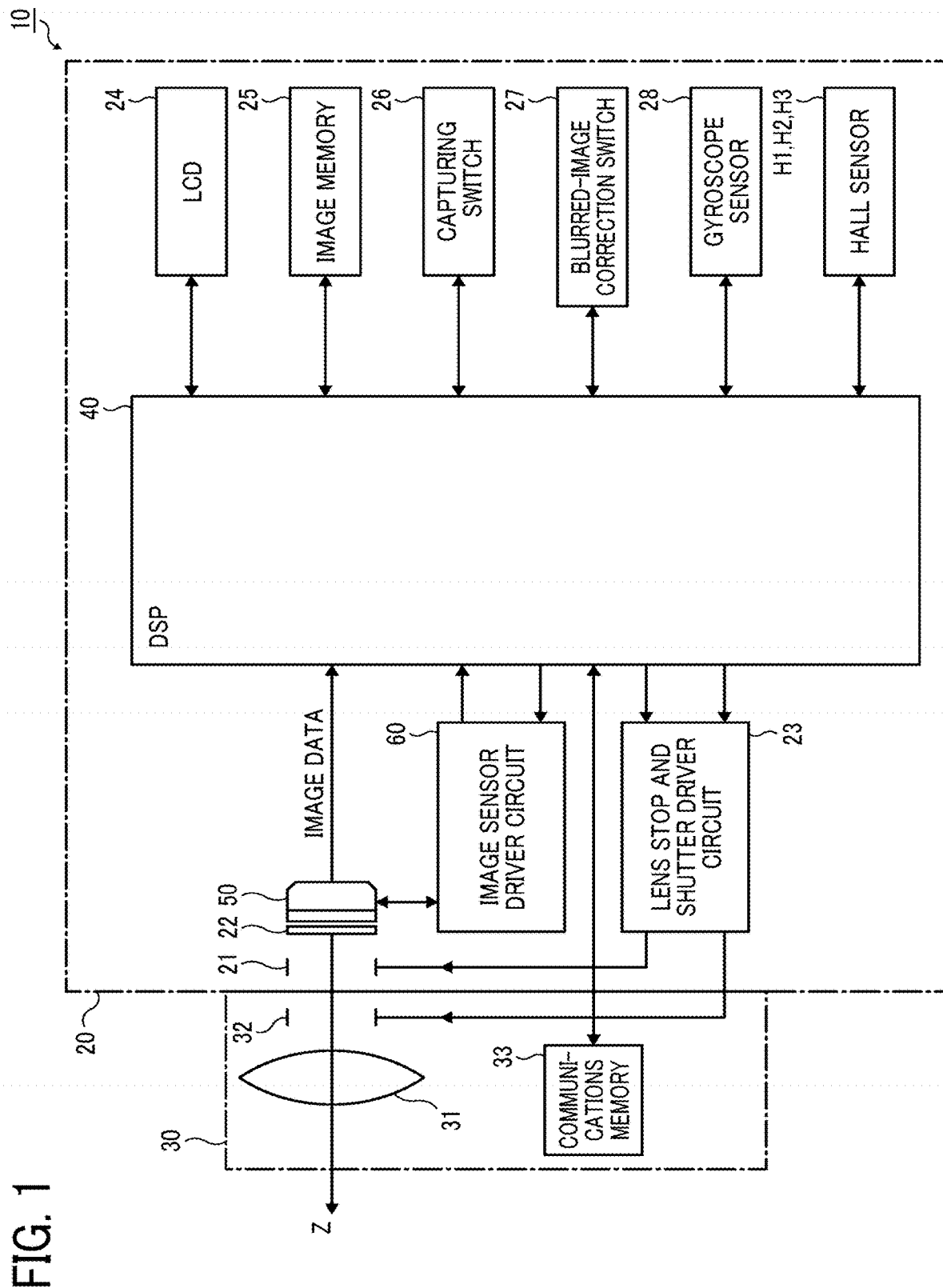
FIG. 1 is a block diagram illustrating a configuration of an imaging device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific integrated circuits (ASICs), field-programmable gate arrays (FPGAs), computers or the like. These terms may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present disclosure are described below with reference to the accompanying drawings.

FIG. 1 is a block diagram illustrating a configuration of an imaging device 10 according to an embodiment of the present disclosure.

Figure 2:
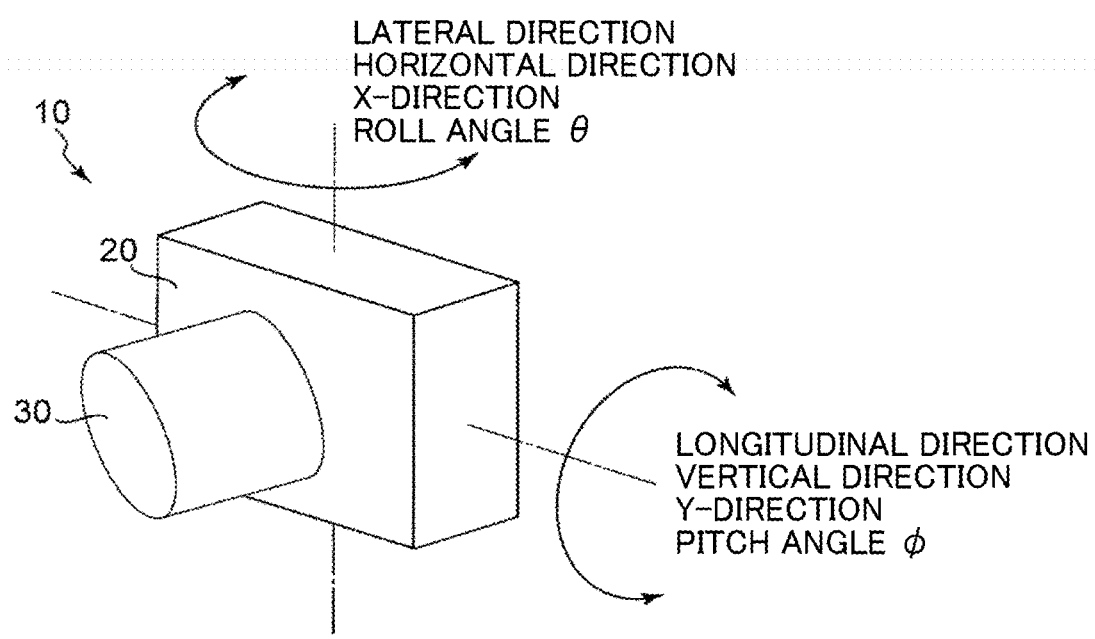
FIG. 2 is a diagram illustrating a signal that indicates the deflection angle of the main unit of the imaging device, which is obtained by a gyroscope sensor of the imaging device of FIG. 1, which serves as an orientation data acquisition unit.

FIG. 2 is a diagram illustrating the arrangement of the angles of rotation of a camera to be detected as a shake detection signal, according to the present embodiment.

Figure 3:
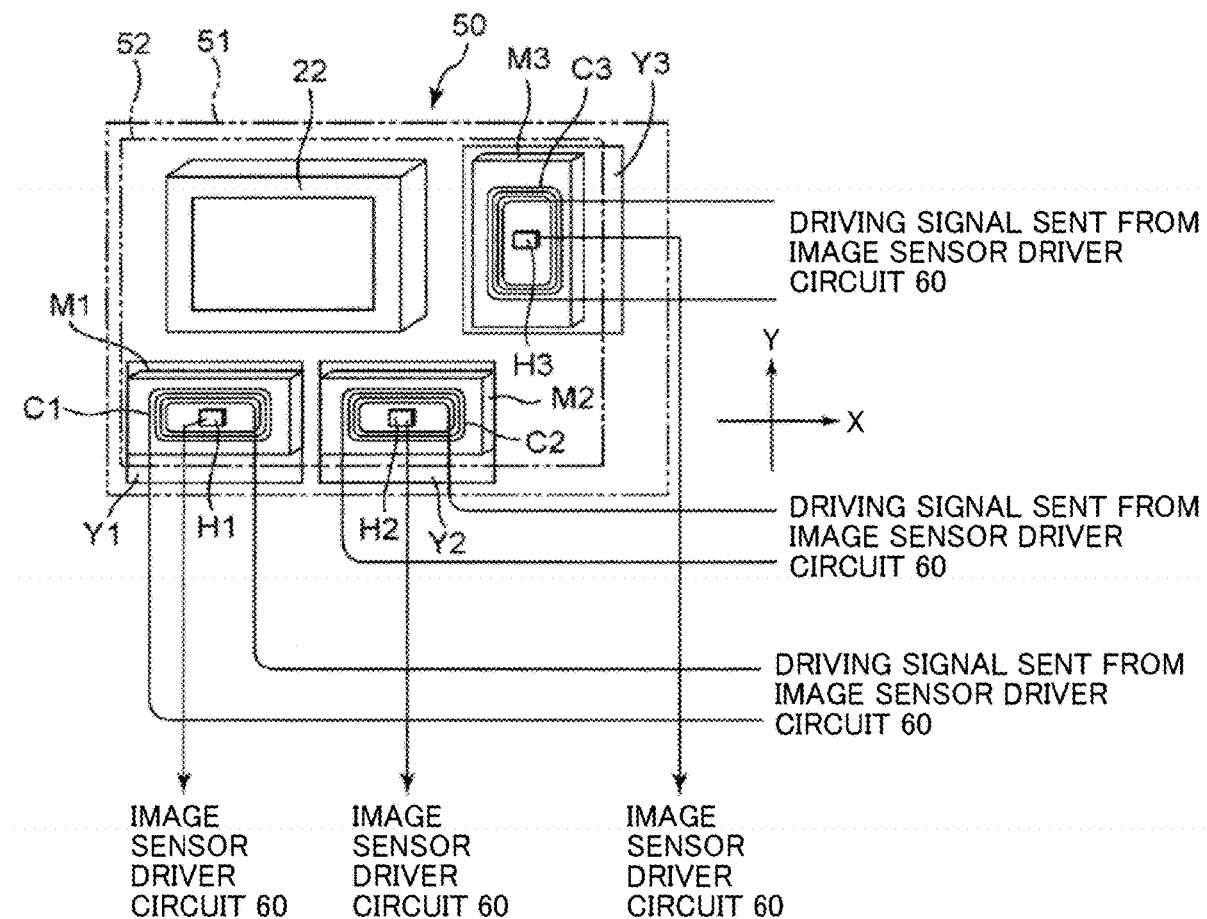
FIG. 3 is a plan view of a blurred-image correction device provided for the imaging device of FIG. 1, according to an embodiment of the present disclosure.

FIG. 3 is a schematic plan view of the blurred-image correction device 50 according to the present embodiment.

Figure 4:
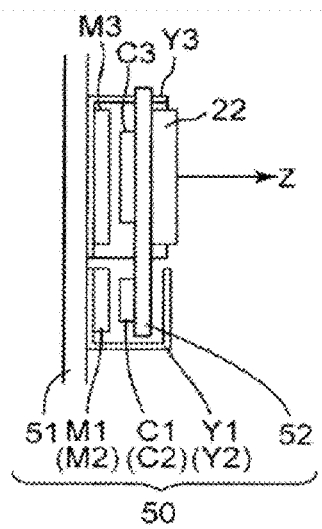
FIG. 4 is a side view of a configuration of a blurred-image correction device provided for the imaging device of FIG. 1, according to an embodiment of the present disclosure.

FIG. 4 is a schematic side view of the blurred-image correction device 50 according to the present embodiment.

The imaging device 10 according to the present embodiment is, for example, a digital camera, and includes a main unit 20 of the camera and a picture-taking lens 30 that is detachable from the main unit 20 of the camera. More specifically, the picture-taking lens 30 is replaceable. The picture-taking lens 30 includes a group of picture-taking lenses 31 that serves as an imaging optical system and a blurred-image correction unit, and a lens stop 32 that serves as an imaging optical system, in an order listed from the object side, which is the left side in FIG. 1, toward the images side, which is the right side in FIG. 1. The main unit 20 of the camera includes a shutter 21 that serves as an imaging optical system and an image sensor 22 that serves as a blurred-image correction unit, in an order listed from the object side, which is the left side in FIG. 1, toward the images side, which is the right side in FIG. 1. Moreover, the main unit 20 of the camera includes a lens stop and shutter driver circuit 23 that controls the operation of the lens stop 32 and the shutter 21 when the picture-taking lens 30 is attached to the main unit 20 of the camera.

Object light flux is incident on the group of picture-taking lenses 31 and passes through the lens stop 32 and the shutter 21, and an object image is formed on the photo-sensing surface of the image sensor 22 by such object light flux. The object image that is formed on the photo-sensing surface of the image sensor 22 is converted into electrical pixel signal by a large number of pixels arranged in a matrix, and is output to a digital signal processor (DSP) 40 as the image data. The DSP 40 performs predetermined image processing on the image data output from the image sensor 22. Then, the DSP 40 displays an image on a liquid crystal display (LCD) 24 based on the obtained image data, and stores image data in an image memory 25. Note also that such an LCD may be referred to as a monitor in the following description. In FIG. 1, the group of picture-taking lenses 31 are illustrated as if the group of picture-taking lenses 31 are a single lens. However, no limitation is indicated thereby. In actuality, the group of picture-taking lenses 31 consist of a plurality of lenses including, for example, fixed lenses, variable-magnification lenses that move to change the magnification power, and focusing lenses that move when the focus is adjusted.

The blurred-image corrective mechanism is not limited to a configuration in which the image sensor 22 is driven to perform blurred-image correction, but may be a configuration in which some of the lenses of the imaging optical system or some of the optical elements by the image sensor 22 are used as a blurred-image correction unit and such a blurred-image correction unit is driven to perform the blurred-image correction. In the present description, when the image sensor 22 that serves as a blurred-image correction unit is driven on a plane perpendicular to the optical axis Z of the imaging optical system, at least some of the elements through which the object light flux passes, from among a plurality of elements including the image sensor 22 that serves as a blurred-image correction unit, is driven on a plane perpendicular to the optical axis Z of the imaging optical system.

The picture-taking lens 30 includes a communications memory 33 that stores various kinds of data such as the modulation transfer function (MTF) data of the group of picture-taking lenses 31 and the aperture diameter data or f number data of the lens stop 32. When the picture-taking lens 30 is attached to the main unit 20 of the camera, the various kinds of data that are stored in the communications memory 33 are read by the DSP 40.

The main unit 20 of the camera includes a capturing switch 26 and a blurred-image correction switch 27 that are coupled to the DSP 40. The capturing switch 26 includes various kinds of switches such as a power switch and a release switch. The blurred-image correction switch 27 is used to switch whether or not to perform blurred-image correction operation. When such blurred-image correction is performed, the image sensor 22 is driven on a plane perpendicular to the optical axis Z of the imaging optical system, and the position on the image sensor 22 at which an object image is formed is moved. Note also that such a plane perpendicular to the optical axis Z of the imaging optical system may be referred to as, for example, a perpendicular-to-optical axis plane in the following description. The blurred-image correction operation of the image sensor 22 will be described later in detail.

The main unit 20 of the camera includes a gyroscope sensor 28, which serves as an orientation data acquisition unit or a shake detector, that is coupled to the DSP 40. The gyroscope sensor 28 detects the angular velocity of movement on the X-axis and the Y-axis, which is applied to the main unit 20 of the imaging device 10, to detect the shake detection signal that indicates the degree of shake of the main unit 20 of the camera on a plane perpendicular to the optical axis. The shake detection signal that is generated by the gyroscope sensor 28 is output to an image sensor driver circuit 60, which serves as a drive controller as will be described later in detail, through the DSP 40. Note also that as illustrated in FIG. 2, the gyroscope sensor 28 obtains the roll angle θ and the pitch angle φ of the main unit 20 of the camera as the shake data of the main unit 20 of the camera.

As illustrated in FIG. 1, FIG. 3, and FIG. 4, the image sensor 22 is provided in a movable manner for the blurred-image correction device 50 that serves as a driving mechanism in two directions, i.e., the X-axis direction and the Y-axis direction that are orthogonal to each other and are orthogonal to the optical axis Z of the imaging optical system. The blurred-image correction device 50 includes a fixed supporting substrate 51 fixed to a structure such as the chassis of the main unit 20 of the camera, a movable stage 52 that is slidable on the fixed supporting substrate 51 to which the image sensor 22 is fixed, magnets M1, M2, and M3 fixed to a plane that faces the movable stage 52 of the fixed supporting substrate 51, yokes Y1, Y2, and Y3 that are fixed on the fixed supporting substrate 51 so as to face the respective magnets M1, M2, and M3 having the movable stage 52 therebetween and are made of magnetic substance and make up a magnetic circuit between each one of the yokes Y1, Y2, and Y3 and the corresponding one of the magnets M1, M2, and M3, and driving coils C1, C2, and C3 that are fixed on the movable stage 52 and receive electric current in the magnetic field of the magnetic circuit to generate driving force. The blurred-image correction device 50 applies an alternating voltage that serves as an alternating-current driving signal to the driving coils C1, C2, and C3 to drive the movable stage 52 and the image sensor 22 on a plane perpendicular to the optical axis with reference to the fixed supporting substrate 51. The alternating-current driving signal that is flown into the driving coils C1, C2, and C3 is generated under the control of the DSP 40 by an image sensor driver circuit 60, as will be described later in detail, that may be referred to as a drive controller. The configuration or structure of the image sensor driver circuit 60 and the alternating-current driving signals that are generated by the image sensor driver circuit 60 will be described later in detail.

In the present embodiment, a magnetic drive circuit composed of the magnet M1, the yoke Y1, and the driving coil C1 and a magnetic drive circuit composed of the magnet M2, the yoke Y2, and the driving coil C2, which make up two pairs of magnetic drive circuits, are arranged at prescribed intervals in the longer-side direction of the image sensor 22 that corresponds to the horizontal direction and the X-axis direction, and a magnetic drive circuit composed of the magnet M3, the yoke Y3, and the driving coil C3, which make up one pair of magnetic drive circuits, is arranged in the shorter-side direction of the image sensor 22 that corresponds to the vertical direction and the Y-axis direction and is orthogonal to the longer-side direction of the image sensor 22.

Further, Hall sensors H1, H2, and H3 are arranged on the fixed supporting substrate 51 near the space in the center of each one of the driving coils C1, C2, and C3. The Hall sensors H1, H2, and H3 detect the magnetic force of the magnets M1, M2, and M3 to generate a position detection signal that indicates the current position of the movable stage 52 or the image sensor 22 on a plane perpendicular to the optical axis. Note also that the position detection signal may be referred to as a current-position detection signal in the following description. The Hall sensors H1 and H2 detect the position in the Y-axis direction and the inclination due to the rotation of the movable stage 52 or the image sensor 22, and the Hall sensor H3 detects the position in the X-axis direction of the movable stage 52 or the image sensor 22. The DSP 40 controls the blurred-image correction device 50 through the image sensor driver circuit 60, which will be described later, based on a shake detection signal that is detected by the gyroscope sensor 28 and indicates the degree of shake of the main unit 20 of the camera on a plane perpendicular to the optical axis and a position detection signal that is detected by the Hall sensors H1, H2, and H3 indicates the current position of the image sensor 22 on a plane perpendicular to the optical axis. By so doing, the image sensor 22 is driven on a plane perpendicular to the optical axis. Due to such a configuration, the position on the image sensor 22 at which an object image is formed is moved, and a blurred image due to camera shake can be corrected. In the present disclosure, this series of operation may be referred to as blurred-image correction on the image sensor 22.

When the blurred-image correction operation is not being performed on the image sensor 22, the blurred-image correction device 50 holds the image sensor 22 in the center of the blurred-image correction operating range. In other words, the image sensor 22 is held in the center even if no blurred-image correction operation is not to be performed.

As described above, the imaging device 10 includes an image sensor driver circuit 60 that serves as a drive controller and makes an alternating-current driving signal flown into the driving coils C1, C2, and C3 to drive the image sensor 22 on a plane perpendicular to the optical axis through the blurred-image correction device 50, and the overall operation of the image sensor driver circuit 60 is controlled by the DSP 40.

Figure 5:
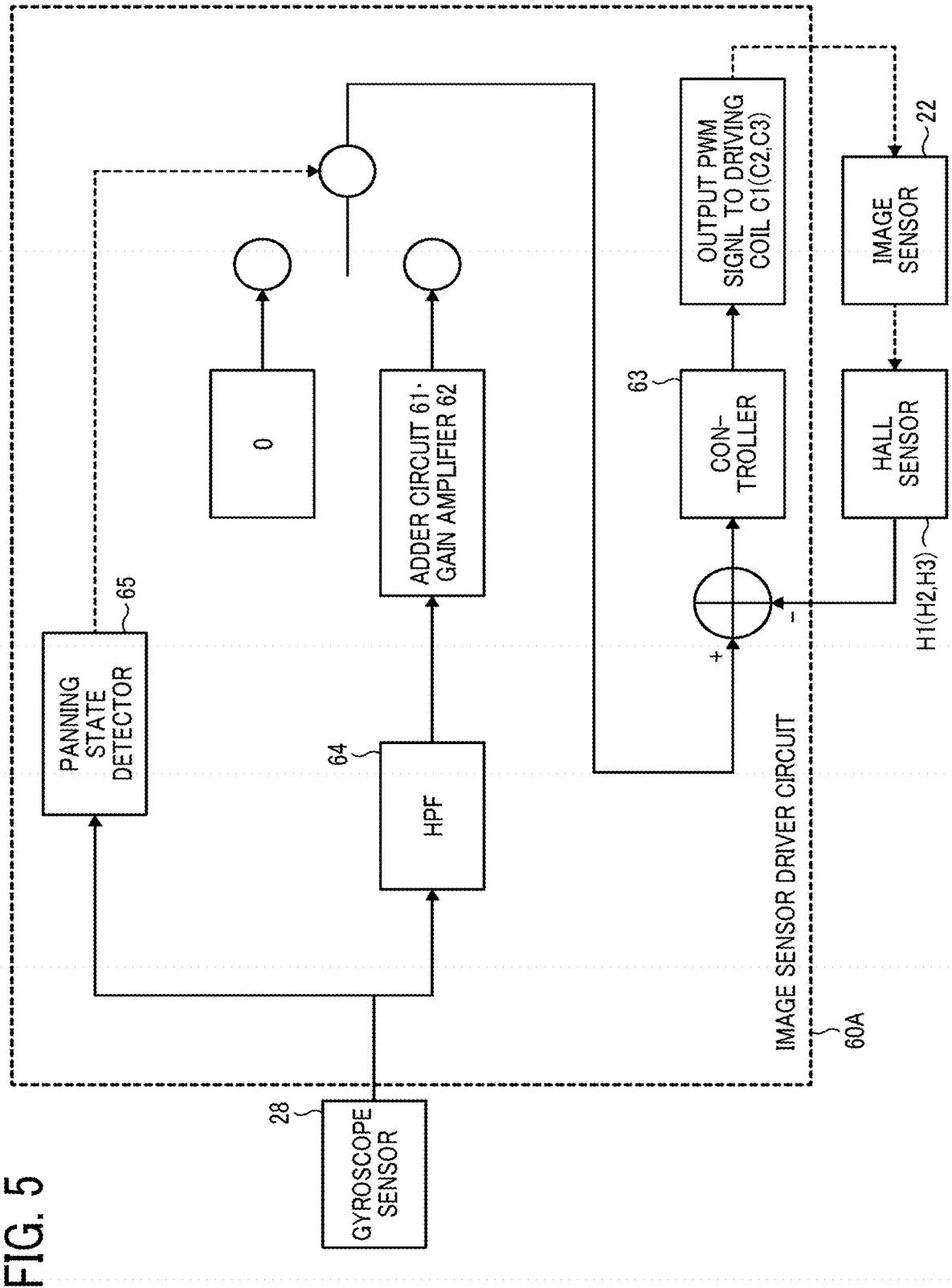
FIG. 5 is a block diagram illustrating how an image sensor driver circuit that includes only a panning state detector controls blurred-image correction using a blurred-image corrective mechanism, according to a control sample of an embodiment of the present disclosure.

In order to facilitate the understanding of the shake reduction processes, as will be described later, that include the following state detection function, according to the present embodiment, the shake reduction processes that include only a panning state detecting function are described below as a control sample of the above embodiment of the present disclosure with reference to the block diagram as illustrated in FIG. 5.

FIG. 5 is a block diagram illustrating how an image sensor driver circuit 60A that includes only a panning state detector 65 controls the blurred-image correction using the blurred-image corrective mechanism, according to a control sample of the above embodiment of the present disclosure.

The image sensor driver circuit 60A as known in the art, which is used for the shake reduction processes that includes only the panning state detecting function, includes an adder circuit 61, a gain amplifier 62, a controller 63 that serves as a drive controller, a high pass filter 64, and a panning state detector 65. The high pass filter 64 performs high-pass filtering on the shake detection signal that is detected by the gyroscope sensor 28 and indicates the degree of shake of the main unit 20 of the camera on a plane perpendicular to the optical axis, and generates a signal from which the direct-current (DC) components on a steady state caused due to changes in temperature or electrical noise have been removed. It is desired that the cutoff frequency of the high-pass filtering be sufficiently low that the direct-current (DC) components on a steady state is removable.

The adder circuit 61 performs an add operation on the shake detection signal from which the DC components have been removed by the high pass filter 64. The gain amplifier 62 amplifies the shake detection signal on which an add operation has been performed by the adder circuit 61. As a result, a control objective position signal is generated that indicates the control objective position of the image sensor 22. The panning state detector 65 determines whether the main unit 20 of the camera belongs to the panning state based on the shake detection signal detected by the gyroscope sensor 28. When it is determined that the main unit 20 of the camera belongs to the panning state, the control objective position signal to be input to the controller 63, which is generated by the gain amplifier 62, is replaced with 0. In other words, feedback control is performed on the blurred-image correction device 50 as a pulse-width modulation (PWM) signal is output to the driving coils C1 to C3 based on the deviation signal (differential signal) between the 0 signal that is set by the panning state detector 65 as a result of replacement and a current-position detection signal detected by the Hall sensors H1, H2, and H3 that indicates the current position of the image sensor 22.

When the panning state detector 65 determines that the main unit 20 of the camera does not belong to the panning state but belongs to the normal state, the controller 63 outputs the pulse-width modulation (PWM) signal to the driving coils C1 to C3 based on the deviation signal (differential signal) between a control objective position signal generated by the gain amplifier 62 and a current-position detection signal detected by the Hall sensors H1, H2, and H3, to perform feedback control on the image sensor 22 driven by the blurred-image correction device 50 (see, for example, FIG. 3 and FIG. 4). The control objective position signal indicates the control objective position of the image sensor 22, and the current-position detection signal indicates the current position of the image sensor 22.

Figure 6:
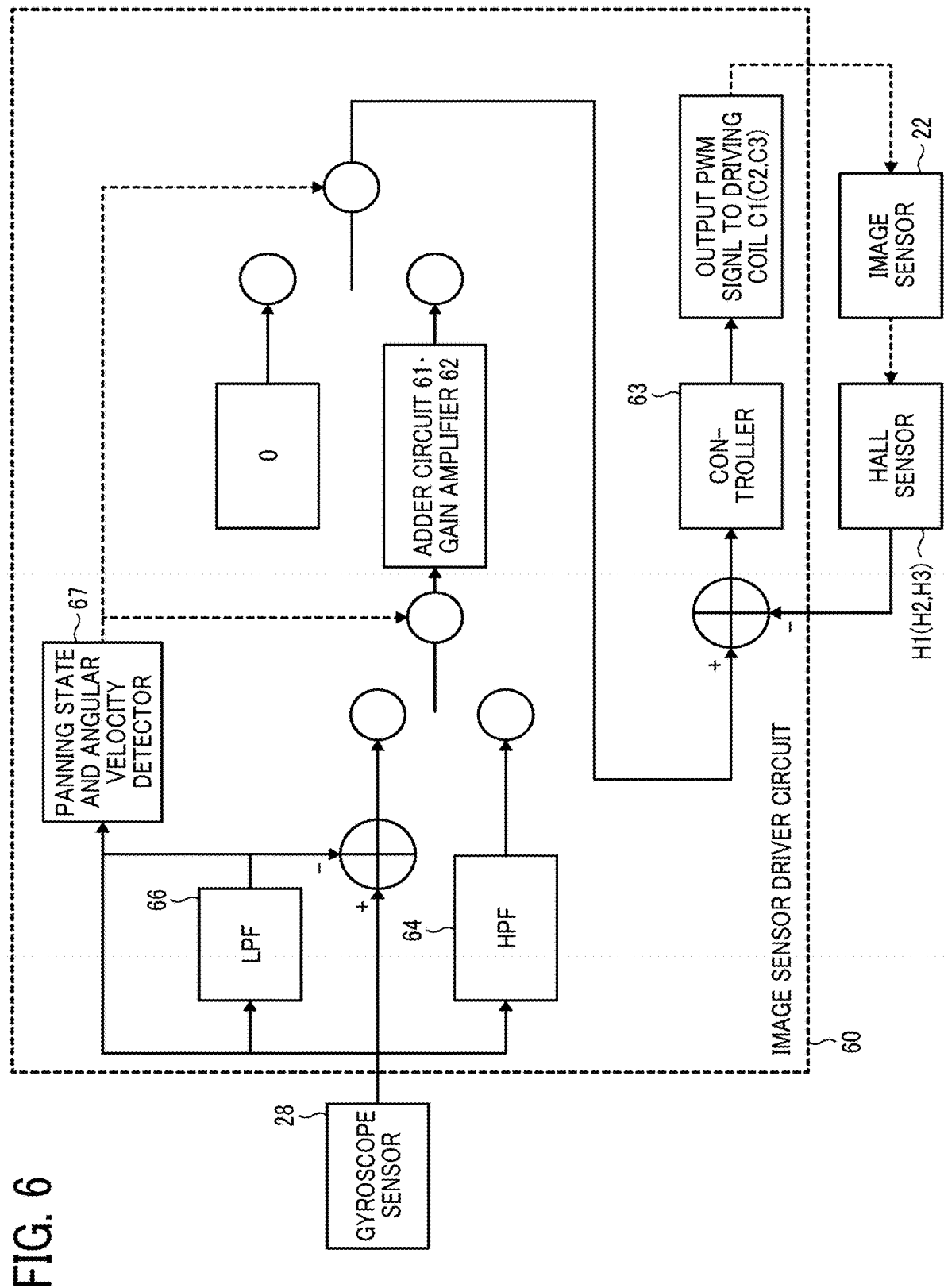
FIG. 6 is a block diagram illustrating how an image sensor driver circuit controls blurred-image correction using a blurred-image corrective mechanism, according to an embodiment of the present disclosure.

The shake reduction (SR) processes that include the following state detection function, according to the present embodiment, are described below with reference to the block diagram as illustrated in FIG. 6.

FIG. 6 is a block diagram illustrating how the image sensor driver circuit 60 controls blurred-image correction using the blurred-image corrective mechanism, according to the present embodiment.

In the present embodiment, the states in which the main unit 20 of the camera is moving at an angular velocity equal to or faster than a certain threshold are classified into the following state or the panning state depending on the degree of angular velocity. In the present embodiment, it is assumed that the angular velocity is greater when the main unit 20 of the camera is determined to be in the panning state than when the main unit 20 of the camera is determined to be in the following state. The angular velocity is computed based on the shake detection signal detected by the gyroscope sensor 28. The drive modes in which the blurred-image correction device 50 is driven are classified into the following mode or the panning mode depending on the following state and the panning state.

As illustrated in FIG. 6, compared with the image sensor driver circuit 60A according to the related art that includes only the panning state detector 65 as described above with reference to FIG. 5, the image sensor driver circuit 60 that is used for the shake reduction (SR) processes according to the present embodiment further includes a low pass filter (LPF) 66, and includes a following state or panning state detector 67, which may be referred to as a condition determining unit, in place of the panning state detector 65. The low pass filter 66 performs low-pass filtering on the shake detection signal detected by the gyroscope sensor 28 to generate a low-frequency signal from which high-frequency components including camera-shake components have been removed. The cutoff frequency of the low pass filter 66 may be as low as to attenuate some of the camera-shake components, and it is satisfactory as long as the cutoff frequency of the low pass filter 66 is higher than the cutoff frequency of the high pass filter 64.

The following state or panning state detector 67 determines whether or not the main unit 20 of the camera belongs to the following state based on the low-frequency signal generated by the low pass filter 66, in addition to the determination as to whether the main unit 20 of the camera belongs to the panning state, which is performed by the panning state detector 65 of FIG. 5 based on the shake detection signal detected by the gyroscope sensor 28. When it is determined that the main unit 20 of the camera does not belong to any of the following state and the panning state, it is determined that the main unit 20 of the camera belongs to the normal state.

When it is determined that the main unit 20 of the camera belongs to the normal state, the DC components in the shake detection signal detected by the gyroscope sensor 28 are removed by high pass filter 64, and the resultant signal is sent to the controller 63 through the adder circuit 61 and the gain amplifier 62. As a result, the blurred-image correction device 50 is driven in the normal mode, and the shake reduction (SR) processes are performed.

On the other hand, when it is determined that the main unit 20 of the camera belongs to the following state, the shake detection signal from which the DC components have been removed, which is generated by the high pass filter 64, is replaced with the shake detection signal detected by the gyroscope sensor 28 from which the low-frequency signal generated by the low pass filter 66 has been subtracted, and the resultant signal is input to the adder circuit 61. Then, the blurred-image correction device 50 is driven in the following mode. When it is determined that the main unit 20 of the camera belongs to the panning state, the control objective position signal to be input to the controller 63 is replaced with 0, and the blurred-image correction device 50 is driven in the panning mode. Note also that the function of the image sensor driver circuit 60 according to the present embodiment is equivalent to the function of the image sensor driver circuit 60A according to the related art that includes only the panning state detector 65 as illustrated in FIG. 5, except for the function related to the configuration or structure of the low pass filter 66 and the following state or panning state detector 67. Moreover, the shake detection signals are sampled per control cycle, and for example, the signals that are computed per control cycle and output from the low pass filter 66 are subtracted from the shake detection signals.

In the imaging device 10 according to the present embodiment, the states in which the shake reduction (SR) function is turned on are recognized as one of a plurality of kinds of states, and processes suited for each one of the recognized states are performed.

Figure 7:
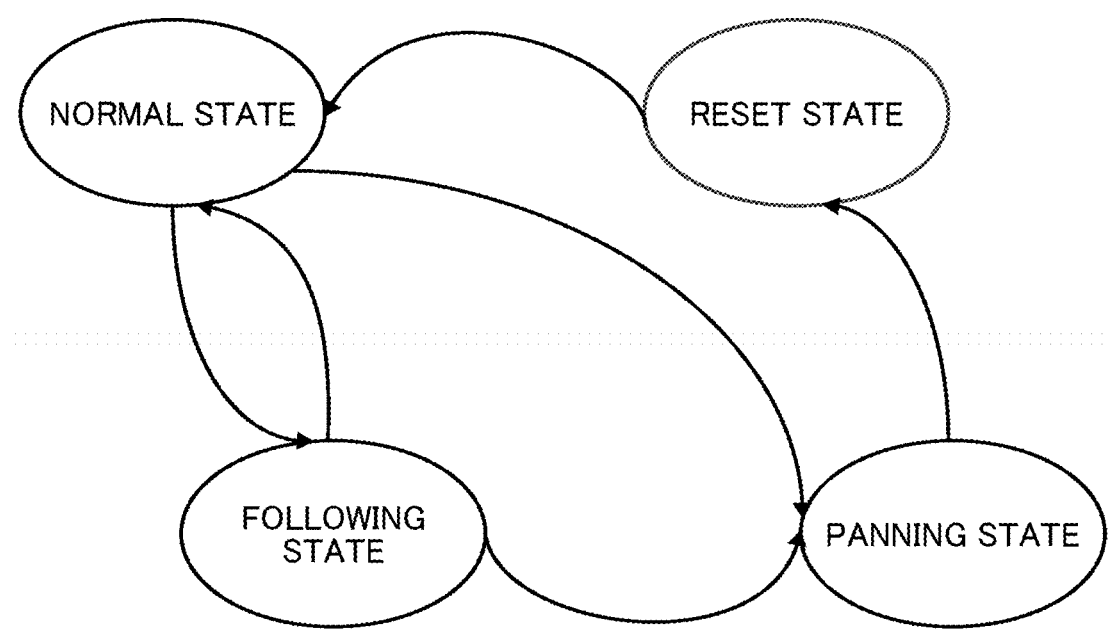
FIG. 7 is a schematic diagram illustrating the relation among a plurality of transferable states including a normal state, a following state, a panning state, and a reset state in which shake reduction (SR) is turned on, according to an embodiment of the present disclosure.

FIG. 7 is a schematic diagram illustrating a plurality of states recognized at the imaging device 10 and how the state could shift from one of the states to another one of the states, according to the present embodiment.

In the present embodiment, the states in which the shake reduction (SR) is turned on are recognized as one of the four kinds of states including a reset state in addition to the above three states including the normal state, the following state, and the panning state. In the present embodiment, the reset state corresponds to the length of time during which the high pass filter 64 is reset. As known in the art, when the state shifts from the panning state in which the main unit 20 of the camera operates at an angular velocity equal to or faster than a certain threshold to the normal state in which the main unit 20 of the camera is stationary, it takes a certain length of time before the output signal is stabilized due to the properties and characteristics of the high pass filter 64. For this reason, the shake reduction (SR) during this period of time may end in vain. In the present embodiment, when the state shifts from the panning state to the normal state in which the camera is stationary, the high pass filter 64 is reset, and the length of time required until a signal output from the high pass filter 64 is stabilized is shortened.

As illustrated in FIG. 7, the SR state can be shifted from the normal state to the following state or the panning state, and the SR state can also be shifted from the following state to the normal state or the panning state. The states in which the shake reduction (SR) is turned on can be shifted only to the reset state from the panning state, and the states in which the shake reduction is turned on can be shifted only to the normal state from the reset state.

The shake reduction (SR) processes according to the present embodiment are described below with reference to FIG. 8 to FIG. 14.

Figure 8:
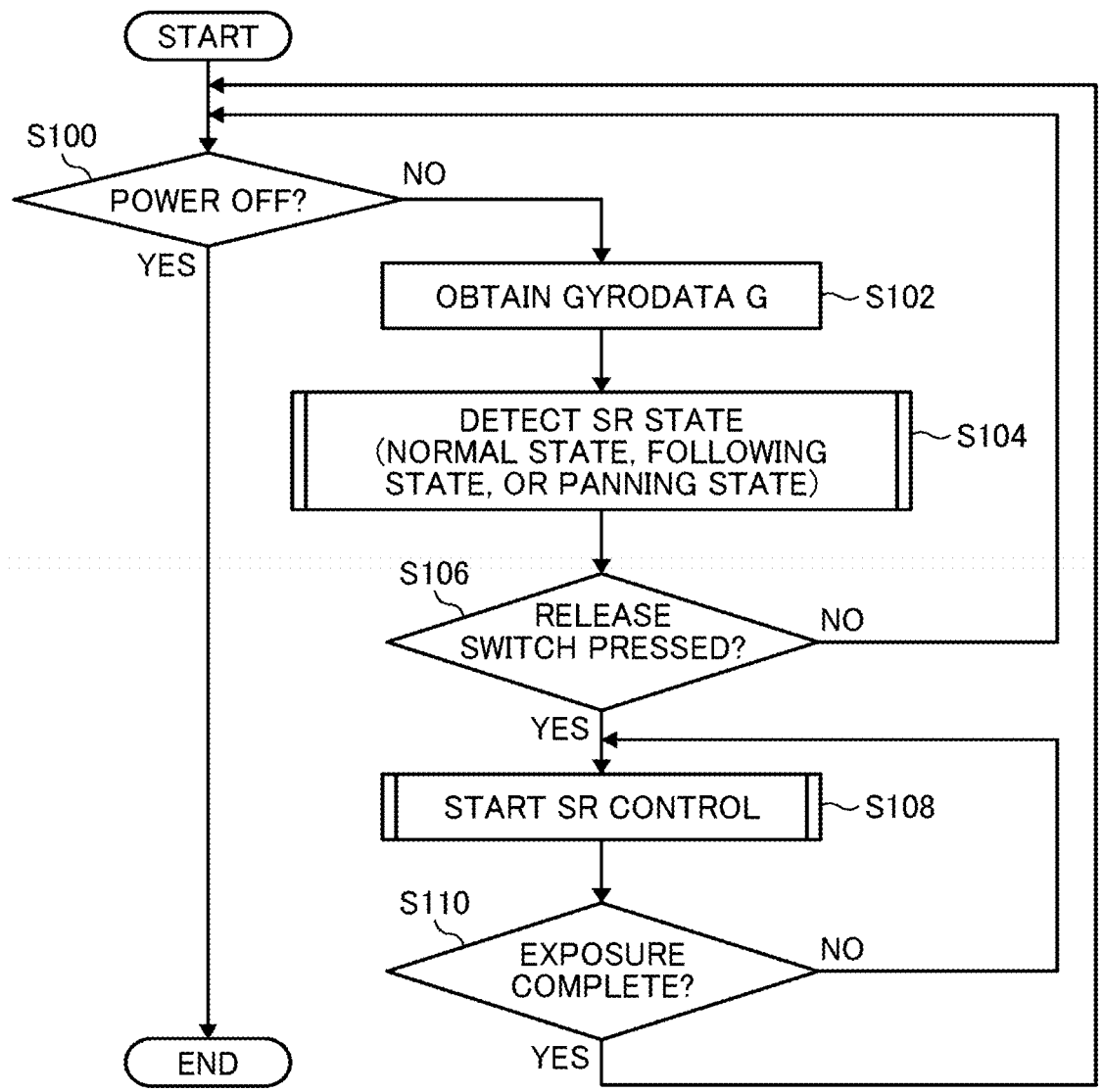
FIG. 8 is a flowchart of the overall shake reduction (SR) processes according to an embodiment of the present disclosure.

FIG. 8 is a flowchart of the overall shake reduction (SR) processes at the time of light exposure, according to the present embodiment.

The DSP 40 determines whether the power of the of the main unit 20 of the camera is turned on or turned off in a step S100, and when it is determined that the power is turned off, this series of processes is terminated. When it is determined that the power is not turned off, the gyrodata G is obtained from the gyroscope sensor 28 in a step S102.

Then, the gyrodata G is input to the image sensor driver circuit 60, and to which one of the normal state, the following state, and the panning state the current SR state belong is determined in a step S104 in accordance with the procedure in FIG. 8 as will be described later. Subsequently, whether the release switch on the main unit 20 of the camera is pressed is determined in a step S106. When it is determined that the release switch is not pressed, the process returns to the above step S100 where whether the power is turned on or turned off is determined, and the same processes are repeated. In other words, the gyrodata G is repeatedly updated at prescribed timings, for example, in very short cycles, every several milliseconds (ms), or every tens of microseconds (μs). Other kinds of operation control or the like are executed in parallel with this update. In the present embodiment, the gyrodata is obtained in the step prior to the step in which the release switch is operated. However, no limitation is indicated thereby, and the gyrodata may be obtained immediately before the shake reduction (SR) control is performed. Alternatively, the gyrodata may be obtained while, for example, the release switch is continuously in a turned-on state and a series of shots are being taken.

When it is determined that the release switch is pressed, in accordance with the procedure in FIG. 13 as will be described later, the shake reduction (SR) controlling processes start in a step S108 based on the previously determined SR state. Subsequently, whether the image sensor 22 has completed the exposure is determined in a step S110. When it is determined that exposure is not yet completed, the SR controlling processes in the step S108 are repeated. When it is determined that exposure is completed, the process returns to the above step S100 where whether the power is turned on or turned off is determined, and the above processes are repeated in a similar manner.

How the SR state is determined to be one of the normal state, the following state, and the panning state as in the step S104 of FIG. 8 is described below with reference to FIG. 6 and the flowcharts of FIG. 9 to FIG. 12.

Figure 9:
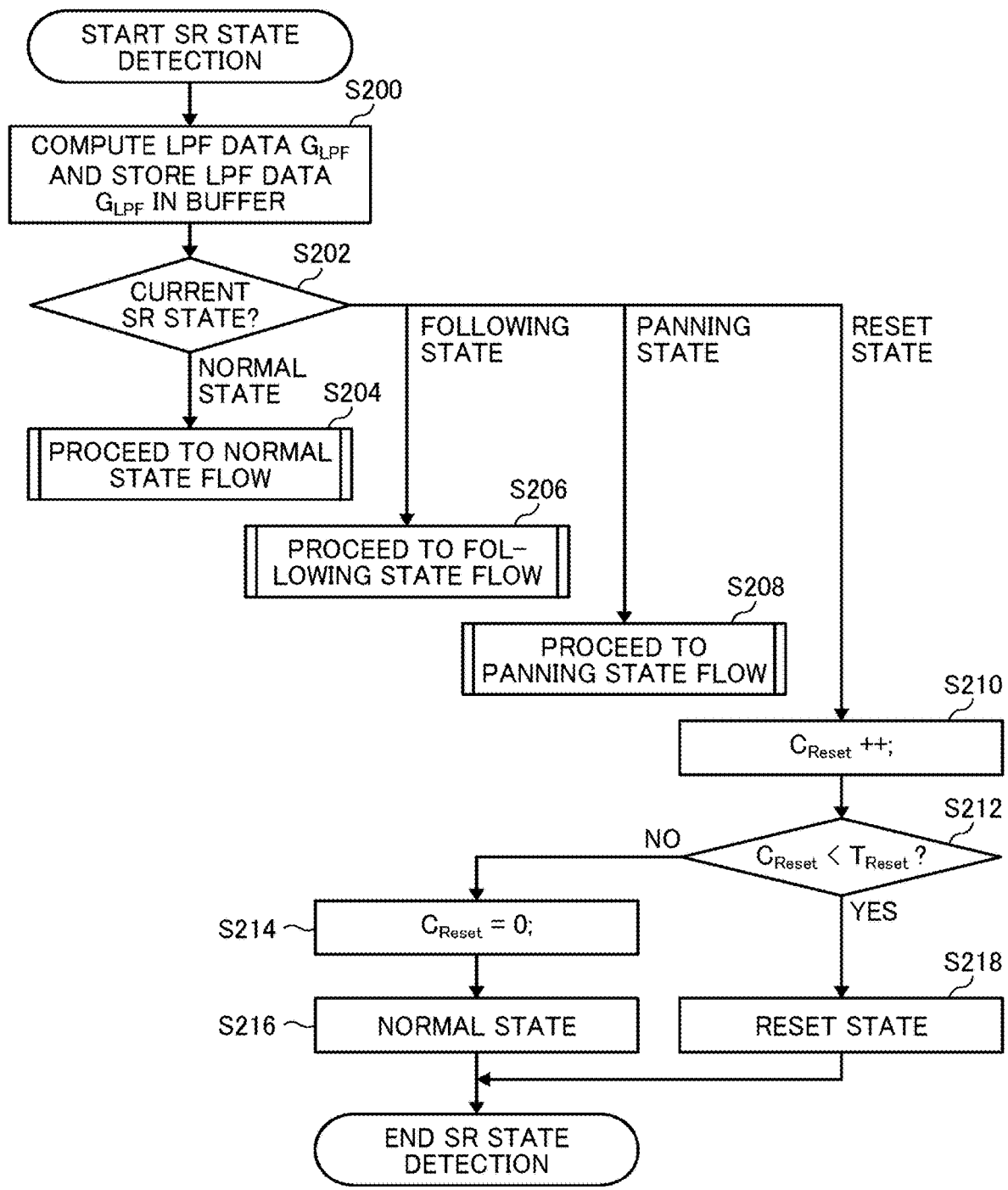
FIG. 9 is a flowchart of the SR state detection processes in a step S104 of FIG. 8.

FIG. 9 is a flowchart of the SR state detection processes in the step S104 of FIG. 8, according to the present embodiment.

Once the SR state detection processes in the step S104 of FIG. 8 start in the imaging device 10 according to the present embodiment, the image sensor driver circuit 60 inputs the received gyrodata G to the low pass filter 66 to generate a low-frequency signal $G_{LPF}$, and stores the data of the low-frequency signal $G_{LPF}$ in a limited buffer used to determine that the current SR state belongs to the following state, in a step S200. When the limited buffer becomes full, the latest data is stored upon deleting the oldest data. Subsequently, to what state the current SR state belongs is determined in a step S202, and when it is determined that the current SR state belongs to a normal state, the SR state to be shifted to next is determined in a step S204 in accordance with the flowchart of FIG. 10 as will be described later. On the other hand, when it is determined that the current SR state belongs to the following state, the SR state to be shifted to next is determined in a step S206 in accordance with the flowchart of FIG. 11 as will be described later. When it is determined that the current SR state belongs to the panning state, the SR state to be shifted to next is determined in a step S208 in accordance with the flowchart of FIG. 12 as will be described later.

On the other hand, when it is determined that the current SR state belongs to the reset state, the value of the reset state counter $C_{Reset}$ is increased in a step S210, and whether or not the value of the reset state counter $C_{Reset}$ is smaller than a reset state counter threshold $T_{Reset}$ is determined in a step S212. When it is determined that the value of the reset state counter $C_{Reset}$ is greater than the reset state counter threshold $T_{Reset}$, the value of the reset state counter $C_{Reset}$ is reset to 0 in a step S214. Then, it is determined that the current SR state belongs to the normal state and the mode is set to the normal mode in a step S216, and this series of processing is terminated. On the other hand, when it is determined that the value of the reset state counter $C_{Reset}$ is smaller than the reset state counter threshold $T_{Reset}$, The high pass filter 64 is reset in a step S218, and this series of processing is terminated.

The to-be-shifted-to SR state or drive mode determining processes in the normal state according to the present embodiment, which are executed in the step S204 of FIG. 9, are described below with reference to FIG. 6 and the flowchart of FIG. 10.

Figure 10:
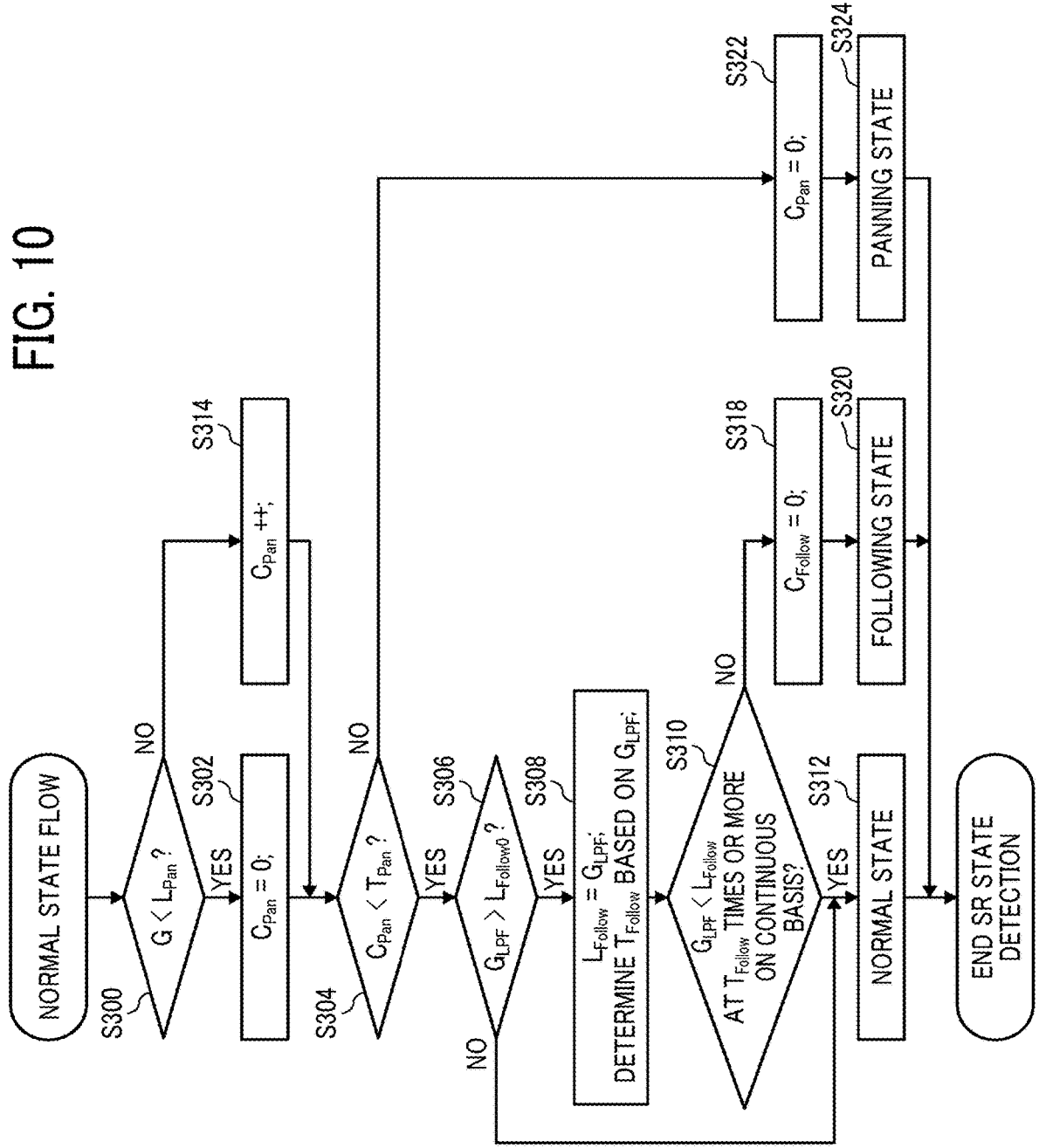
FIG. 10 is a flowchart of SR state determination processes in a normal state, according to an embodiment of the present disclosure.

FIG. 10 is a flowchart of SR state determination processes in the normal state, according to the present embodiment.

Firstly, the following state or panning state detector 67 determines whether the gyrodata G is smaller than a panning state detection threshold $L_{Pan}$ in a step S300. When, $G \geq L_{Pan}$, the value of the panning state detection counter $C_{Pan}$ is increased in a step S314. On the other hand, the value of the panning state detection counter $C_{Pan}$ is reset to 0 in a step S302 when $G < L_{Pan}$. Subsequently, whether the value of the panning state detection counter $C_{Pan}$ is equal to or smaller than a panning state detection counter threshold $T_{Pan}$, which may also be referred to as a panning state detection time threshold, is determined in a step S304. When it is determined that the value of the panning state detection counter $C_{Pan}$ is greater than the panning state detection counter threshold $T_{Pan}$, the value of the panning state detection counter $C_{Pan}$ is reset to 0 in a step S322. Then, it is determined that the current SR state has been shifted to the panning state, and the mode is set to the panning mode in a step S324. Then, the SR state detection processes in FIG. 9 are completed and end. In the present embodiment, the value of the panning state detection counter $C_{Pan}$ may be 0. In such cases, as soon as the value of the gyrodata G increases and $G \geq L_{Pan}$, the mode is set to the panning mode.

When it is determined in the step S304 that the value of the panning state detection counter $C_{Pan}$ is equal to or less than the panning detection counter threshold $T_{Pan}$, whether the low-frequency signal $G_{LPF}$ is greater than the following state detection minimum threshold $L_{Follow0}$ is determined in a step S306. When $G_{LPF} \leq L_{Follow0}$, it is determined that the current SR state is maintained in the normal state, and the mode is set to the normal mode in a step S312. Then, the SR state detection processes in FIG. 10 are completed. On the other hand, when $G_{LPF} > L_{Follow0}$, the value of the following state detection threshold $L_{Follow}$ is set to the low-frequency signal $G_{LPF}$, and the following state detection counter threshold $T_{Follow}$ is determined in a step S308 based on the value of the low-frequency signal $G_{LPF}$.

Unless the values of the low-frequency signal $G_{LPF}$ that are obtained in the last $T_{Follow}$ times and are stored in a limited buffer are all greater than the following state detection threshold $L_{Follow}$ ($G_{LPF} > L_{Follow}$), the value of the following state detection counter $C_{Follow}$ is reset to 0 in a step S318, and it is determined that the current state in which the shake reduction (SR) is turned on has been shifted to the following state. Then, the mode is set to the following mode in a step S320, and the SR state detection processes in FIG. 9 are completed and end. On the other hand, when the values of the low-frequency signal $G_{LPF}$ that are obtained in the last $T_{Follow}$ times and are stored in a limited buffer are all smaller than the following state detection threshold $L_{Follow}$ ($G_{LPF} < L_{Follow}$) in the step S310, it is determined that the current SR state is maintained in the normal state. Then, the mode is set to the normal mode in a step S312, and the SR state detection processes in FIG. 10 are completed and end.

The to-be-shifted-to SR state or drive mode determining processes in the following state according to the present embodiment, which are executed in the step S206 of FIG. 9, are described below with reference to FIG. 6 and the flowchart of FIG. 11.

Figure 11:
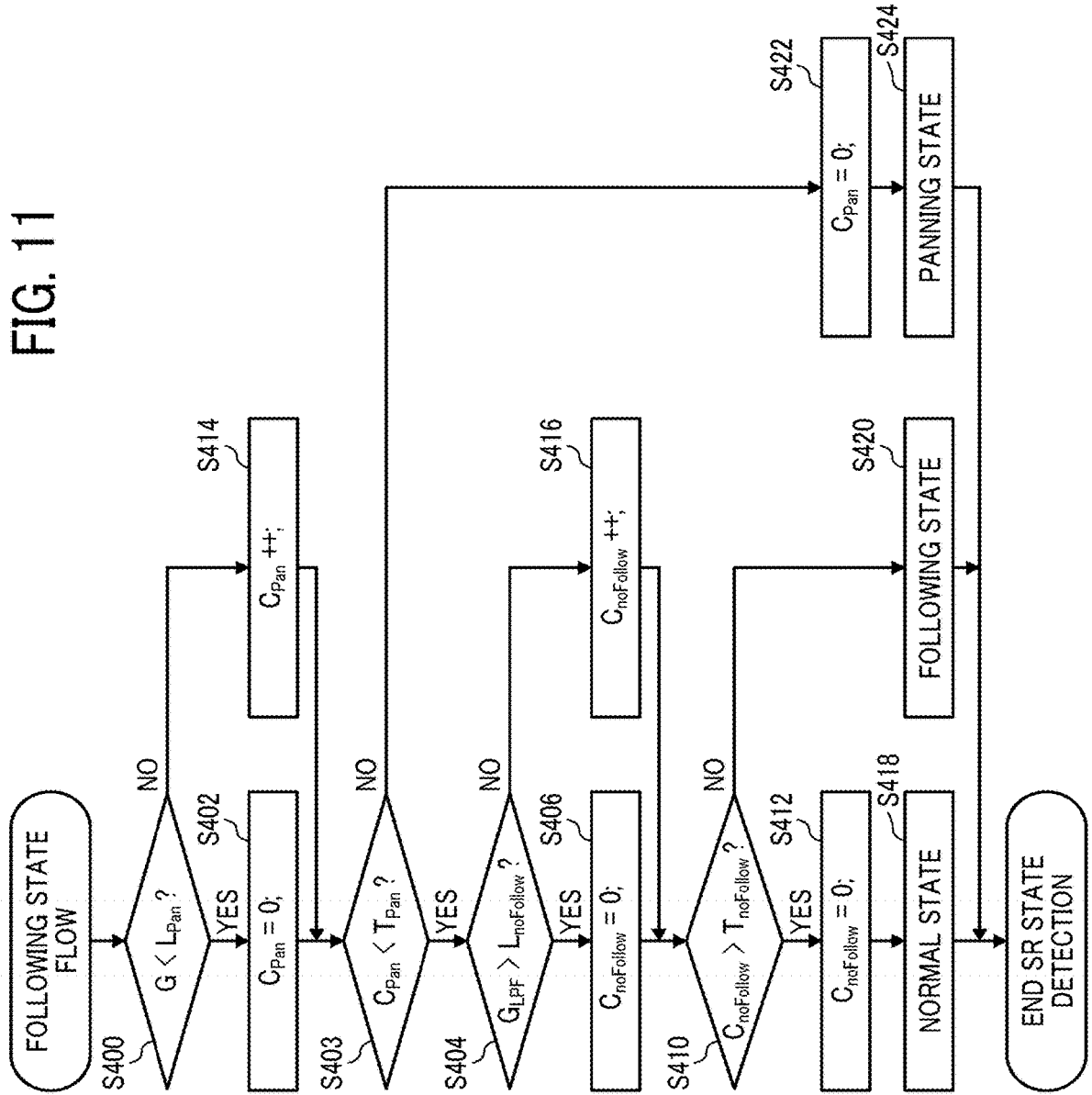
FIG. 11 is a flowchart of SR state determination processes in a following state, according to an embodiment of the present disclosure.

FIG. 11 is a flowchart of SR state determination processes in the following state, according to the present embodiment.

Firstly, the following state or panning state detector 67 determines whether the gyrodata G is smaller than the panning state detection threshold $L_{Pan}$ in a step S400, and when $G \geq L_{Pan}$, the value of the panning state detection counter $C_{Pan}$ is increased in a step S414. On the other hand, the value of the panning state detection counter $C_{Pan}$ is reset to 0 in a step S402 when $G < L_{Pan}$. Subsequently, whether or not the value of the panning state detection counter $C_{Pan}$ is smaller than a panning state detection counter threshold $T_{Pan}$ is determined in a step S403. When it is determined that the value of the panning state detection counter $C_{Pan}$ is greater than the panning state detection counter threshold $T_{Pan}$, the value of the panning state detection counter $C_{Pan}$ is reset to 0 in a step S422. Then, it is determined that the current SR state has been shifted to the panning state, and the mode is set to the panning mode in a step S424. Then, the SR state detection processes in FIG. 9 are completed and end.

On the other hand, when it is determined in the step S403 that the value of the panning state detection counter $C_{Pan}$ is equal to or less than the panning state detection counter threshold $T_{Pan}$, whether the low-frequency signal GLPF is greater than the non-following state detection threshold $L_{noFollow}$ is determined in a step S404. The value of the non-following state detection counter $C_{Follow}$ is increased in a step S416 when $G_{LPF} \leq L_{noFollow}$. The value of the non-following state detection counter $C_{noFollow}$ is reset to 0 in a step S406 when $G_{LPF} > L_{noFollow}$. Note also that the value of the non-following state detection threshold $L_{noFollow}$ is set to a value equal to or smaller than the panning state detection threshold $L_{Pan}$.

Subsequently, whether the non-following state detection counter $C_{noFollow}$ is greater than a non-following state detection counter threshold $T_{noFollow}$, which may also be referred to as a non-following state detection time threshold, is determined in a step S410. When the value of the non-following state detection counter $C_{noFollow}$ is equal to or smaller than the non-following state detection counter threshold $T_{noFollow}$, it is determined that the current SR state is maintained in the following state, and the mode is set to the following mode in a step S420. Then, the SR state detection processes in FIG. 9 are completed and end.

On the other hand, when it is determined in the step S410 that the value of the non-following state detection counter $C_{noFollow}$ is greater than the non-following state detection counter threshold $T_{noFollow}$, the value of the non-following state detection counter $C_{noFollow}$ is reset to 0 in a step S412. Then, it is determined that the current SR state has been shifted to the normal state, and the mode is set to the normal mode in a step S418, and the SR state detection processes in FIG. 9 are completed.

The to-be-shifted-to SR state or drive mode determining processes in the panning state according to the present embodiment, which are executed in the step S208 of FIG. 9, are described below with reference to FIG. 6 and the flowchart of FIG. 12.

Figure 12:
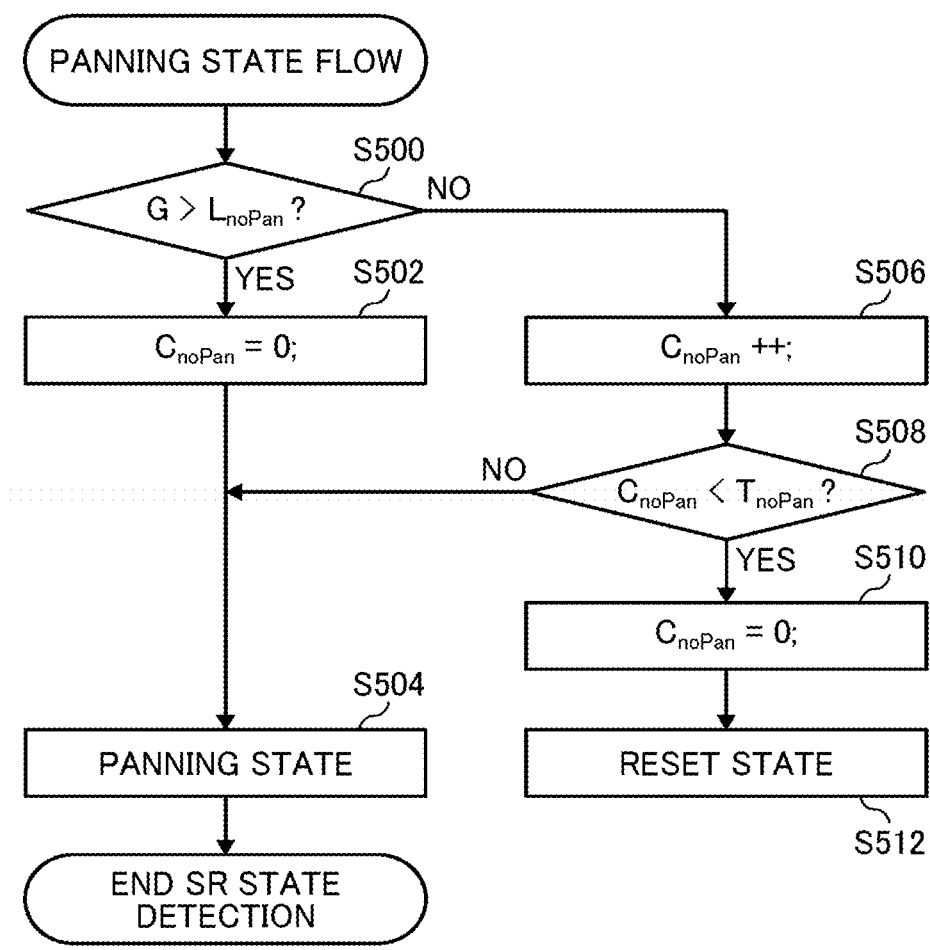
FIG. 12 is a flowchart of SR state determination processes in a panning state, according to an embodiment of the present disclosure.

FIG. 12 is a flowchart of SR state determination processes in the panning state, according to the present embodiment.

Firstly, in a step S500, the following state or panning state detector 67 determines whether the gyrodata G is greater than the non-panning state detection threshold $L_{noPan}$. When $G>L_{noPan}$, the value of the non-panning state detection counter $C_{noPan}$ is reset to 0 in a step S502. Then, it is determined that the current SR state is maintained in the panning state, and the mode is set to the panning mode in a step S504. Then, the SR state detection processes in FIG. 9 are completed and end. Note also that the value of the non-panning state detection threshold $L_{noPan}$ is set to a value equal to or smaller than the panning state detection threshold $L_{Pan}$.

On the other hand, when $G \leq L_{noPan}$, the value of the non-panning state detection counter $C_{noPan}$ is increased in a step S506, and whether the value of the non-panning state detection counter $C_{noPan}$ is smaller than a non-panning state detection counter threshold $T_{noPan}$, which may also be referred to as a non-panning state detection time threshold in the following description, is determined in a step S508. When it is determined that the value of the non-panning state detection counter $C_{noPan}$ is greater than the non-panning state detection counter threshold $T_{noPan}$, it is determined that the current SR state is maintained in the panning state, and the mode is set to the panning mode in a step S504. Then, the SR state detection processes in FIG. 9 are completed and end. In the present embodiment, the value of the non-panning state detection counter threshold $T_{noPan}$ may be 0. In such cases, as soon as the value of the gyrodata G decreases and $G \leq L_{Pan}$, the mode is set to the panning mode.

On the other hand, when it is determined in the step S508 that the value of the non-panning state detection counter $C_{noPan}$ is smaller than the non-panning state detection counter threshold $T_{noPan}$, the value of the non-panning state detection counter $C_{noPan}$ is reset to 0 in a step S510, and the SR state is reset in a step S512. Then, the high pass filter 64 is reset, and the SR state detection processes in FIG. 9 are completed.

The SR controlling processes according to the present embodiment are described below with reference to FIG. 6 and the flowchart of FIG. 13.

Figure 13:
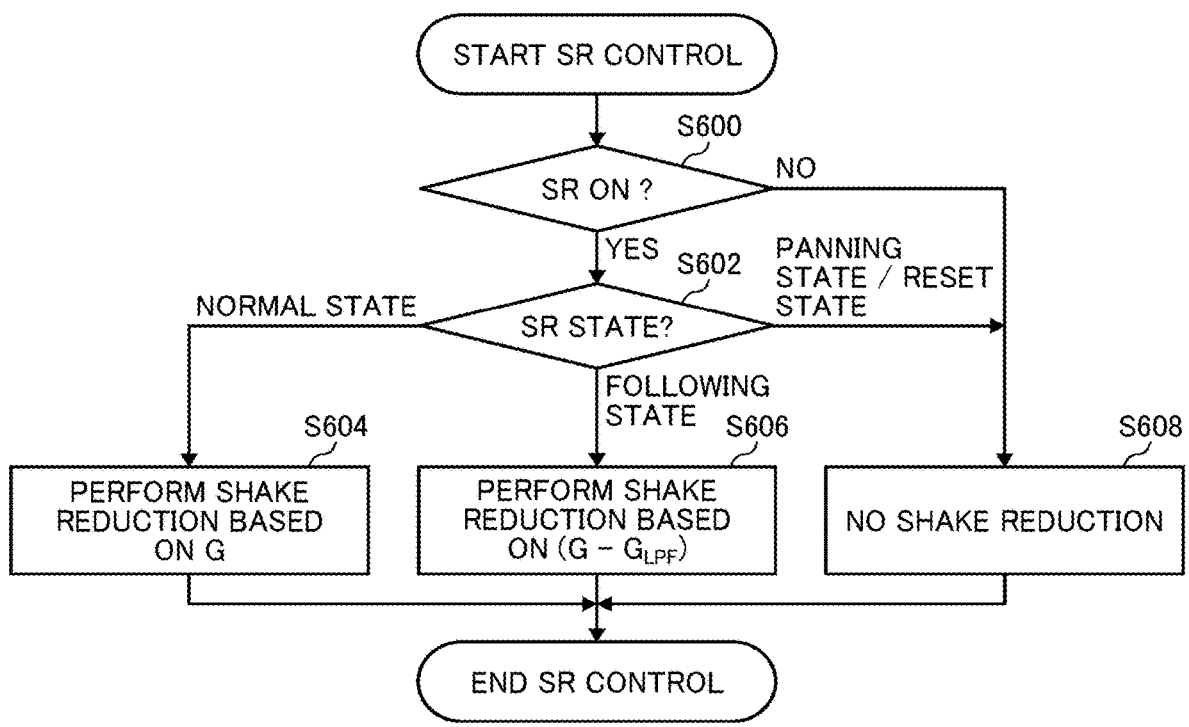
FIG. 13 is a flowchart of SR control processes in a step S108 of FIG. 8.

FIG. 13 is a flowchart of SR control processes in the step S108 of FIG. 8.

Firstly, the image sensor driver circuit 60 determines whether the shake reduction (SR) function is turned on in a step S600, and when it is determined that the SR function is not turned on, the image sensor driver circuit 60 replaces a control objective position signal to be input to the controller 63 with 0. As a result, no shake reduction (SR) is performed, and this series of processing is terminated in a step S608. When it is determined that the SR function is turned on, to what state the current SR state belongs is determined in a step S602. When it is determined that the current SR state belongs to the normal state, the mode is set to the normal mode and a computational control objective position signal is calculated and obtained in a step S604 based on a direct-current (DC) component removal signal $G_{HPF}$ generated as the gyrodata G is input to the high pass filter 64. On the other hand, when it is determined that the current SR state belongs to the following state, the mode is set to the following mode and a computational control objective position signal is calculated and obtained in a step S606 based on the signal obtained by subtracting the low-frequency signal $G_{LPF}$ from the gyrodata G. When it is determined that the current SR state belongs to the panning state or the reset state, the mode is set to the panning mode in a step S608, and a control objective position signal to be input to the controller 63 is replaced with 0. As a result, no shake reduction (SR) is performed.

Figure 14:
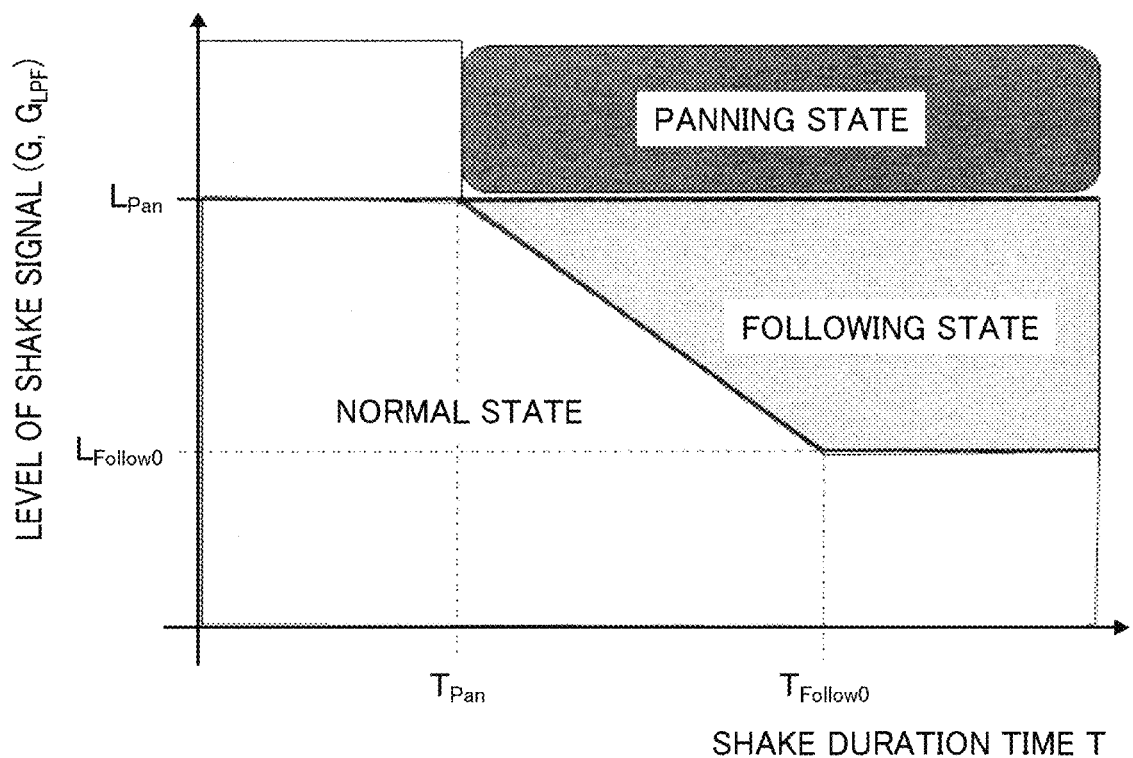
FIG. 14 is a graph illustrating the relation among several states of the SR state, which is determined based on a shake duration time T and the level of a shake signal (G or $G_{LPF}$), according to an embodiment of the present disclosure.

FIG. 14 is a graph illustrating the relation among several states of the SR state, which is determined based on the shake duration time T and the level of shake signal (G or $G_{LPF}$), according to the present embodiment.

When the signal level of the gyrodata G is equal to or greater than $L_{Pan}$ for a period of time equal to or longer than a panning state detection counter threshold $T_{Pan}$, it is determined that the current SR state belongs to the panning state. The value of the following state detection counter threshold $T_{Follow}$ is determined based on the signal level of $G_{LPF}$ when the signal level of the low-frequency signal $G_{LPF}$ of the gyrodata G is equal to or greater than $L_{Follow0}$, and unless the signal level of the low-frequency signal $G_{LPF}$ at that time is not continuously smaller than $T_{Follow}$ times or more, where $T_{Follow}$ indicates a following state detection counter threshold, which may also be referred to as a following state detection time threshold, it is determined that the current SR state belongs to the following state. The other cases are considered to be the normal state or the reset state in which the state is on the way returning from the panning state to the normal state. When the signal level of the low-frequency signal $G_{LPF}$ is equal to or greater than $L_{Pan}$, the value of the following state detection counter threshold $T_{Follow}$ is set to the panning state detection counter threshold $T_{Pan}$. When the signal level of the low-frequency signal $G_{LPF}$ is equal to the following state detection minimum threshold $L_{Follow0}$, the value of the following state detection counter threshold $T_{Follow}$ is set to the maximum value $T_{Follow0}$ of the following state detection counter threshold, which is greater than the value of $T_{Pan}$. If the signal level of the low-frequency signal $G_{LPF}$ is somewhere between $L_{Follow0}$ and $L_{Pan}$, as illustrated in FIG. 14, the value of $T_{Follow}$ is calculated using, for example, the linear interpolation. Note also that the relation between $G_{LPF}$ and $T_{Follow}$ is satisfactory as long as a unique value can be determined for $T_{Follow}$, and may be represented by a curved line or a zigzag line that connects a point ($T_{Pan}$, $L_{Pan}$) and a point ($T_{Follow0}$, $L_{Follow0}$) in FIG. 14.

As described above, according to the present embodiment, the distinction between the following state and the normal state in which the camera is held by hand can be done with a high degree of precision, and the normal state in which the imaging device is held by hand can be identified with a high degree of precision.

A shake detection signal in the normal state in which the camera is held by hand is a combination of the signal component of the frequency of about 1 to 20 hertz (Hz), and the amplitude of the low-frequency components is small. The amplitude of the high-frequency components is relatively large. The continuous shaking period of low-frequency components in the same direction is relatively long. For this reason, if the threshold of shake signal that is used to distinguish between the image capturing in the following mode and the image capturing in the normal mode is set to a small value, the distinction between the image capturing in the following mode and the image capturing in the normal mode becomes difficult. In the present embodiment, a duration time threshold used to distinguish between the following state or the normal state is changed depending on the level of the shake detection signal sampled per control cycle from which the signal that is computed per control cycle and output from the low pass filter 66 is subtracted. More specifically, the duration time threshold is increased when the resultant signal is small, and the duration time threshold is decreased when the resultant signal is large. Due to such a configuration, the following state at low velocity can be distinguished from the hand-held normal state.

If the gyrodata G does not include direct-current (DC) components on a steady state that are caused due to changes in temperature or electrical noise, in the normal mode, the gyrodata G may be input to the adder circuit just as it is instead of the direct-current (DC) component removal signal $G_{HPF}$, and a computational control objective position signal may be calculated and obtained. In the following mode, a signal that is obtained based on the cutoff frequency of the high pass filter 64, which is different from the signal used in the normal mode, may be used instead of the signal obtained by subtracting the low-frequency signal $G_{LPF}$ from the gyrodata G.

Note that numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present disclosure may be embodied in the form of a computer program stored on any kind of storage medium. Examples of storage media include, but are not limited to, flexible disks, hard disks, optical discs, magneto-optical discs, magnetic tape, nonvolatile memory cards, read only memory (ROM), etc. Alternatively, any one of the above-described and other methods of the present disclosure may be implemented by ASICs, prepared by interconnecting an appropriate network of conventional component circuits, or by a combination thereof with one or more conventional general-purpose microprocessors and/or signal processors programmed accordingly.

What is claimed is:

1. An imaging device comprising:
    an imaging optical system through which object light flux passes;
    an image sensor configured to form the object light flux that has passed through the imaging optical system as an object image;
    a shake detector configured to detect shake;
    a blurred-image correction unit including at least one of the image sensor and an optical element that makes up at least a part of the imaging optical system;
    a drive circuit configured to drive the blurred-image correction unit in a direction different from an optical axis of the imaging optical system to move a position on the image sensor at which the object image is formed, to correct a blurred image; and
    a drive controller configured to control, based on a current position and a control objective position of the blurred-image correction unit, operation of the blurred-image correction unit by the drive circuit at a constant control cycle,
    wherein the drive controller includes a low pass filter to which a shake detection signal output from the shake detector is input and a state determining unit configured to determine to which one of a plurality of states the imaging device belongs,
    wherein the plurality of states include a panning state, and the state determining unit is configured to determine that the imaging device belongs to the panning state when the shake detection signal is greater than a panning state threshold,
    wherein the plurality of states include a following state, and the state determining unit is configured to determine that the imaging device belong to one of the plurality of states other than the panning state based on an output signal from the low pass filter when the state determining unit determines that the imaging device does not belong to the panning state,
    wherein the state determining unit is configured to determine that the imaging device belongs to the following state when the output signal from the low pass filter is continuously greater than a following state detection threshold that is smaller than the panning state threshold for a period of time longer than a following state detection time threshold that is determined based on the output signal from the low pass filter,
    wherein the drive controller is configured to make the drive circuit compute an amount of movement of the blurred-image correction unit according to the state determined by the state determining unit, and
    wherein the shake detection signal is sampled per the constant control cycle, and the drive controller is configured to compute the amount of movement of the blurred-image correction unit based on the shake detection signal from which the output signal of the low pass filter that is computed per the constant control cycle is subtracted.

2. The imaging device according to claim 1, wherein the blurred image is not corrected when the state determining unit determines that the imaging device belongs to the panning state.

3. The imaging device according to claim 1,
    wherein the drive controller further comprises a high pass filter to which the shake detection signal output from the shake detector is input,
    wherein the plurality of states include a normal state, and the state determining unit is configured to determine that the imaging device belongs to the normal state when the state determining unit determines that the imaging device does not belong to either one of the panning state and the following state, and
    wherein the drive controller is configured to compute the amount of movement of the blurred-image correction unit based on a signal output from the high pass filter.

4. The imaging device according to claim 1,
    wherein, when the imaging device belongs to one of the plurality of states other than the panning state and a level of the shake detection signal is greater than the panning state threshold for a period of time equal to or longer than a panning state detection time threshold, current one of the plurality of states shifts to the panning state,
    wherein, when the imaging device belongs to the panning state and the level of the shake detection signal is smaller than a non-panning state detection threshold, the state shifts to one of the plurality of states other than the panning state, and
    wherein the non-panning state detection threshold is equal to or smaller than the panning state threshold.

5. The imaging device according to claim 4, wherein, when the imaging device belongs to the panning state and the level of the shake detection signal is smaller than the non-panning state detection threshold for a period of time equal to or longer than a non-panning state detection time threshold, current one of the plurality of states shifts to another one of the plurality of states other than the panning state.

6. The imaging device according to claim 1,
wherein, when the imaging device belongs to one of the plurality of states other than the panning state or the following state and a level of the shake detection signal is greater than the panning state threshold for a period of time equal to or longer than a panning state detection time threshold, current one of the plurality of states shifts to the panning state,
wherein, when the imaging device belongs to the following state and the level of the shake detection signal that has passed through the low pass filter is smaller than a non-following state detection threshold, current one of the plurality of states shifts to another one of the plurality of states other than the panning state and the following state, and
wherein the non-following state detection threshold is equal to or smaller than the panning state threshold.

7. The imaging device according to claim 6, wherein, when the imaging device belongs to the following state and the level of the shake detection signal that has passed through the low pass filter is smaller than the non-following state detection threshold for a period of time longer than a non-following state detection time threshold, current one of the plurality of states shifts to another one of the plurality of states other than the panning state and the following state.

8. The imaging device according to claim 1,
wherein the plurality of states of the imaging device includes a reset state and a normal state, wherein the panning state shifts only to the reset state, and
wherein the reset state shifts only to the normal state.

9. The imaging device according to claim 1, wherein the following state detection time threshold takes a large value when a level of the shake detection signal that has passed through the low pass filter is low and takes a small value when the level of the shake detection signal is high.

10. The imaging device according to claim 1, wherein, when the shake detection signal is equal to or smaller than a state detection minimum threshold that is smaller than the panning state threshold, current one of the plurality of states does not shift to the following state.

11. A method of correcting a blurred image, the method comprising:
capturing, using an image sensor, an object image that has passed through an imaging optical system;
driving a blurred-image correction unit including at least one of the image sensor and an optical element that makes up at least a part of the imaging optical system to correct a blurred image based on a shake detection signal;
determining that the imaging device belongs to a panning state of a plurality of states when the shake detection signal is greater than a panning state threshold;
when the shake detection signal is equal to or smaller than the panning state threshold, determining that the imaging device belongs to one of the plurality of states other than the panning state based on the shake detection signal that has passed through a low pass filter and
determining that the imaging device belongs to a following state of the plurality of states when the shake detection signal that has passed through the low pass filter is continuously greater than a following state detection threshold that is smaller than the panning state threshold for a period of time longer than a following state detection time threshold that is determined based on the shake detection signal that has passed through the low pass filter.

12. The method according to claim 11, wherein, when the imaging device is determined to be in the panning state, blurred-image correction is not performed.

13. The method according to claim 11, further comprising:
determining that the imaging device belongs to a normal state of the plurality of states when the shake detection signal is equal to or smaller than the panning state threshold or the shake detection signal that has passed through the low pass filter is not continuously greater than the following state detection threshold for the period of time longer than the following state detection time threshold; and
computing an amount of movement of the blurred-image correction unit based on a shake detection signal that has passed through a high pass filter.

14. The method according to claim 11, further comprising:
shifting current one of the plurality of states to the panning state when the imaging device belongs to one of the plurality of states other than the panning state and a level of the shake detection signal is greater than the panning state threshold for a period of time equal to or longer than a panning state detection time threshold; and
shifting current one of the plurality of states to one of the plurality of states other than the panning state when the imaging device belongs to the panning state and the level of the shake detection signal is smaller than a non-panning state detection threshold,
wherein the non-panning state detection threshold is equal to or smaller than the panning state threshold.

15. The method according to claim 14, further comprising: shifting current one of the plurality of states to another one of the plurality of states other than the panning state when the imaging device belongs to the panning state and the level of the shake detection signal is smaller than the non-panning state detection threshold for a period of time equal to or longer than a non-panning state detection time threshold.

16. The method according to claim 11, further comprising:
shifting current one of the plurality of states to the panning state when the imaging device belongs to one of the plurality of states other than the panning state or the following state and a level of the shake detection signal is greater than the panning state threshold for a period of time equal to or longer than a panning state detection time threshold; and
shifting current one of the plurality of states to another one of the plurality of states other than the panning state and the following state when the imaging device belongs to the following state and the level of the shake detection signal that has passed through the low pass filter is smaller than a non-following state detection threshold,
wherein the non-following state detection threshold is equal to or smaller than the panning state threshold.

17. The method according to claim 16, further comprising shifting current one of the plurality of states to another one of the plurality of states other than the panning state and the following state when the imaging device belongs to the following state and the level of the shake detection signal that has passed through the low pass filter is smaller than the non-following state detection threshold for a period of time longer than a non-following state detection time threshold.

18. The method according to claim 11, wherein the plurality of states of the imaging device includes a reset state and a normal state, wherein the panning state shifts only to the reset state, and wherein the reset state shifts only to the normal state.

19. The method according to claim 11, wherein the following state detection time threshold takes a large value when a level of the shake detection signal that has passed through the low pass filter is low and takes a small value when the level of the shake detection signal is high.

20. The method according to claim 11, wherein, when the shake detection signal is equal to or smaller than a state detection minimum threshold that is smaller than the panning state threshold, current one of the plurality of states does not shift to the following state.

* * * * *